US012676731B2

(12) United States Patent
Neunzig

(10) Patent No.: US 12,676,731 B2
(45) Date of Patent: Jul. 7, 2026

(54) DATA HASHING IN COMPUTING SYSTEMS

(71) Applicant: SAP SE, Walldorf (DE)

(72) Inventor: Mathis Neunzig, Heidelberg (DE)

(73) Assignee: SAP SE, Walldorf (DE)

( * ) Notice: Subject to any disclaimer, the term of this patent is extended or adjusted under 35 U.S.C. 154(b) by 240 days.

(21) Appl. No.: 18/521,345

(22) Filed: Nov. 28, 2023

(65) Prior Publication Data

US 2025/0175323 A1     May 29, 2025

(51) Int. Cl.
H04L 9/06 (2006.01)
G06F 17/16 (2006.01)
(52) U.S. Cl.
CPC ............ H04L 9/0643 (2013.01); G06F 17/16 (2013.01)
(58) Field of Classification Search
CPC ............................... H04L 9/0643; G06F 17/16
See application file for complete search history.

(56) References Cited

U.S. PATENT DOCUMENTS

| | | | |
|---|---|---|---|
| 8,150,030 | B2 | 4/2012 | Billet et al. |
| 8,824,677 | B1 | 9/2014 | Ramzan et al. |
| 2008/0063187 | A1 | 3/2008 | Yoshida et al. |
| 2010/0306294 | A1* | 12/2010 | Schneider ............. H04L 9/0643 |
| | | | 708/250 |
| 2014/0129568 | A1* | 5/2014 | Kim .................... G06F 16/9014 |
| | | | 707/747 |
| 2017/0364517 | A1* | 12/2017 | Kafai ...................... G06F 17/10 |
| 2018/0270045 | A1* | 9/2018 | Almuhammadi ..... H04L 9/0643 |
| 2023/0076393 | A1* | 3/2023 | Cottle ................... H04L 9/0643 |

OTHER PUBLICATIONS

"Cryptography Hash functions", Tutorials Point India Private Limited, [Online]. Retrieved from the Internet: URL: https: www. tutorialspoint.com cryptography cryptography_hash_functions.htm, (Accessed Jul. 20, 2023), 7 pgs.
"HashAlgorithm. ComputeHash Method", Microsoft Learn, [Online]. Retrieved from the Internet: URL: https: learn. microsoft.com en-us dotnet api system.security.cryptography.hashalgorithm.computehash? view=net-7.0, (Accessed Jul. 11, 2023), 8 pgs.
(Continued)

*Primary Examiner* — Nam T Tran
(74) *Attorney, Agent, or Firm* — SCHWEGMAN LUNDBERG & WOESSNER, P.A.

(57) ABSTRACT

Various examples are directed to systems and methods for hashing an input string. A hashing engine may generate a 1 by N input vector using the input string, where N is a constant number. The hashing engine may expand the input vector to an input matrix, the input matrix having a size of N by N. The hashing engine may access a first integer matrix having a size of N by N and add the first integer matrix and the input matrix to generate an intermediate matrix. The hashing engine may generate a symbol-encoded vector using the intermediate matrix. The hashing engine may also generate a first round output matrix using the symbol-encoded vector and the intermediate matrix and a hash for the input string that is based at least in part on the first round output matrix.

20 Claims, 8 Drawing Sheets

(56) References Cited

OTHER PUBLICATIONS

"SHA3 Hash Package for SAP ABAP", Lupus Consulting, [Online]. Retrieved from the Internet: URL: https: lupusconsulting.com expertise-focus solutions sha3-hash-package , (Accessed Jul. 10, 2023), 6 pgs.

Bellare, Mihir, "Collision-Resistant Hashing: Towards Making UOWHFs Practical", Advances in Cryptology. Springer, [Online]. Retrieved from the Internet: URL: https: link.springer.com content pdf 10.1007 BFb0052256.pdf?pdf=inline%20link, (Jan. 1, 2006), 470-484.

Gryski, Damian, "Minimal Perfect Hash Functions", Gopher Academy, [Online]. Retrieved from the Internet: URL: https: blog. gopheracademy.com advent-2017 mphf , (Dec. 3, 2017), 6 pgs.

Kurpicz, Florian, "Perfect Hash Function Generation on the GPU with RecSplit", Karlsruhe Institute of Technology, [Online]. Retrieved from the Internet: URL: https: algo2.iti.kit.edu 4221.php, (Apr. 2022), 1 pg.

Zola, Andrew, "What is hashing and how does it work?", TechTarget, [Online]. Retrieved from the Internet: URL: https: www.techtarget. com searchdatamanagement definition hashing, (Accessed Jul. 10, 2023), 5 pgs.

* cited by examiner

100

124

130

126

132

128

134

102

HASHING COMPUTING SYSTEM

104

HASHING ENGINE

106

HASH

108

INT. SEQ.

110

INPUT STRING

114

CRYPTOGRAPHIC SECURITY SYSTEM

116

DATA COMPARISON SYSTEM

118

PASSWORD MANAGEMENT SYSTEM

120

DATABASE MANAGEMENT SYSTEM

122

DATA SOURCE

DATA HASHING IN COMPUTING SYSTEMS

BACKGROUND

Hashing is a technique used in computing systems to map input data to a unique value, or hash. The hash is generated by applying a hash function to the input data. The hash is often smaller in size than the input data and can serve as a unique identifier of the input data. An effective hash function is practically one-way or irreversible. That is, it may not be possible to recreate the input data from the hash.

Hashing has many applications and uses in practical computing systems. For example, hashing is used by cryptography computing systems to generate digital signatures and/or otherwise authenticate data. Hashing is also used by various computing systems as an efficient way to compare files. Hashing can also be used by password management or other authentication computing systems to store and utilize passwords uniquely and efficiently. In addition, hashing can be used by identity management systems to validate the identity of a computing system or computing system user. Also, hashing is used by some database management systems as an indexing tool. These are just some example uses of hashing in computing systems.

BRIEF DESCRIPTION OF DRAWINGS

The present disclosure is illustrated by way of example and not limitation in the following figures.

DETAILED DESCRIPTION

Figure 1:
FIG. 1 is a diagram showing one example of an environment comprising a hashing computing system programmed to implement hashing of an input string.

Effective hash functions for use in computing systems have a number of properties. For example, an effective hash function may be irreversible or one-way. That is, while a hash may be generated from input data, it may not be possible to recreate the input data given only the hash. An effective hash function may also minimize or eliminate collisions. A collision occurs when two distinct sets of input data are mapped to the same hash. An effective hash function may also be efficiently computed. That is, a hash function may be more advantageous if it can be calculated simply while consuming fewer memory and processing resources of the computing system.

Applications of hashing in computing systems may be vulnerable to various different attacks. For example, some hash functions may be vulnerable to a brute force attack. In a brute force attack, an attacker applies the hash function to many instances of input data attempting to generate a hash that is equivalent to a hash to be hacked. As the use of hashing continues to expand, a brute force attack against a hash function can be carried out in a distributed manner. For example, an attacker may apply the hash function to a batch of input data and post the results to be accessed by other attackers. The other attackers may then apply their own brute force efforts more efficiently, making a defeat of the hash function more likely.

Various examples address these and other challenges by utilizing a hashing technique that is irreversible, collision resistant, and efficiently calculated. In various examples, the hashing techniques described herein may also exhibit an avalanche effect. According to an avalanche effect, changing a single value of input data may cause a substantial change in the resulting hash.

In various examples, a hash function may receive an input string of arbitrary size. The input string may comprise a number of symbol-encoded values. For example, values in the input string may correspond to alphanumeric or other characters according to a symbol encoding arrangement such as, for example, American Standard Code for Information Interchange (ASCII), UTF-1, UTF-8, UTF-16, UTF-32, or another suitable encoding. The input string may be fit to a 1 by N input vector. The 1 by N input vector may be expanded to an N by N input matrix. In some examples, fitting an input string of arbitrary size to a fixed-size data structure, such as the 1 by N vector and/or the N by N input matrix, may increase the security of the hash function by increasing the difficulty of reversing the hash function.

The N by N input matrix may be added to an integer matrix to generate an intermediate matrix. The integer matrix may also have the size N by N and may be derived from a set of known integer sequences, for example, as described herein. The intermediate matrix may also have the size N by N. A symbol-encoded vector may be generated from the intermediate matrix. A round output matrix may then be generated using the symbol-encoded vector and the intermediate matrix.

In some examples, additional rounds may be performed using the round output matrix as a new input matrix. In some examples, different integer matrices derived from different integer sequences or different portions of the same integer sequence may be used in different rounds. The round output matrix of the final round may be mapped to a symbol encoding range of values corresponding to a symbol encoding arrangement. The symbol-encoded round output matrix of the final round may be used as a hash of the original input string.

FIG. 1 is a diagram showing one example of an environment 100 comprising a hashing computing system 102 programmed to implement hashing of an input string 110. The environment 100 includes the hashing computing system 102 and, optionally, downstream systems 114, 116, 118, 120. The hashing computing system 102 executes a hashing engine 104. The hashing engine 104 receives one or more integer sequences 108 as well as an input string 110. From these, the hashing engine 104 generates a hash 106 of the input string 110. The hash 106 may be used by one or more of the downstream systems 114, 116, 118, 120. In some examples, the input string 110 may be provided by one of the downstream systems 114, 116, 118.

The hashing computing system 102 and/or downstream systems 114, 116, 118, 120 may be implemented in an on-premise environment. For example, an enterprise utilizing the hashing computing system 102 and/or downstream computing system(s) 114, 116, 118, 120 may maintain an on-premise computing system. The hashing computing system 102 and/or downstream computing system(s) 114, 116, 118, 120 may be implemented by executing appropriate software at the on-premise computing system. Users 124, 126, 128 associated with the enterprise may access the hashing computing system 102 and/or downstream computing system(s) 114, 116, 118, 120 by accessing the on-premise computing system, for example, using user computing devices 130, 132, 134. User computing devices 130, 132, 134 may be any suitable computing device including, for example, laptop computers, desktop computers, tablet computers, mobile computing devices, and/or the like.

In some examples, the hashing computing system and/or downstream computing systems 114, 116, 118, 120 are implemented in a cloud environment. For example, the hashing computing system and/or downstream computing systems 114, 116, 118, 120 may be implemented in a public cloud environment or in a private cloud environment. In a private cloud environment, the enterprise may provide applications, implement storage, and the like, to implement the hashing computing system and/or downstream computing systems 114, 116, 118, 120 at the private cloud environment. Executables and/or other software for implementing the hashing computing system and/or downstream computing systems 114, 116, 118, 120 at the private cloud environment may be provided, for example, by a software provider.

In a public cloud environment, the cloud environment is arranged into a number of tenancies implemented by a cloud service provider. The cloud service provider may provide one or more executables or other components to implement the hashing computing system and/or downstream computing systems 114, 116, 118, 120 at the public cloud environment. The enterprise may hold one or more tenancies, allowing users 124, 126, 128 of the enterprise to access one or more instances of the hashing computing system and/or downstream computing systems 114, 116, 118, 120 at the public cloud environment.

The downstream systems 114, 116, 118 and may include a cryptographic security system 114. The cryptographic security system 114 is a computing system that is configured to apply cryptographic techniques to achieve computing system security. For example, the cryptographic security system may be programmed to utilize the hash 106 to generate a digital certificate or other digital means of verifying the input string 110.

A data comparison system 116 is a computing system that is programmed to compare two or more sets of input data. For example, in the context of the data comparison system 116, the input string 110 may represent a first file or other data to be compared. The data comparison system 116 may also provide the hashing computing system 102 with one or more other input strings 110 representing additional files or other data to be compared with the first file or other data. The hashing engine 104 may generate corresponding hashes 106 for the one or more other input strings 110. The data comparison system 116 may compare the respective files or other data by comparing the hash is generated by the hashing engine 104. If the hashes are equivalent, then the data comparison system 116 may determine that the sets of input data are also equivalent. If the hashes are not equivalent, then the data comparison system 116 may determine that the sets of input data are not equivalent.

A password management system 116 is a computing system that is programmed to store and/or manage passwords, such as user passwords. The password management system 116 may prompt the hashing computing system 102 to generate hashes 106 corresponding to a set of passwords (for example, passwords associated with accounts held by users 124, 126, 128). When a user 124, 126, 128 attempts to log on to a computing system, the user may, directly or indirectly, provide their password to the password management system 118. The password management system 118 may provide the received password to the hashing engine 104, which may generate a corresponding hash 106. The password management system 118 may compare the hash of the received password to a stored hash associated with the user 124, 126, 128. If the hash 106 of the received password matches the stored hash associated with the user 124, 126, 128, then the password management system 118 may authorize the user's log in. If the hash 106 of the received password does not match the stored hash associated with the user 124, 126, 128, then the password management system 118 may decline the user's login.

A database management system 120 is a computing system that is programmed to manage a database at one or more data stores, such as, the data store 122. The database management system may use the hashing computing system 102 to generate hash indices for tables, rows, columns, and/or other units of data stored at the database. For example, the database management system 120 may provide data from a table, a row, column, and/or other unit of data stored at the database to the hashing computing system 102 as an input string 110. The database management system 120 may utilize the corresponding hash 106 as an index for storing the data at the database. The index may also be used in searching when querying data.

It will be appreciated that the downstream systems 114, 116, 118, 120 are examples of systems that may utilize the described hashing techniques implemented by the hashing engine 104. It will be appreciated that the hashing techniques implemented by the hashing engine 104 may also be used in various other contexts.

The hashing engine 104, in some examples, is or includes executable code that may be executed at the hashing computing system 102 to generate the hash 106 from the one or more integer sequences 108 and the input string 110. In the arrangement of FIG. 1, the hashing engine 104 executes at a hashing computing system 102 that provides the hash 106 to one or more of the downstream systems 114, 116, 118, 120. It will be appreciated that, in various examples, the hashing engine 104 may be executed at one or more of the downstream systems 114, 116, 118, 120 in addition to or instead of executing at the hashing computing system 102.

Figure 2:
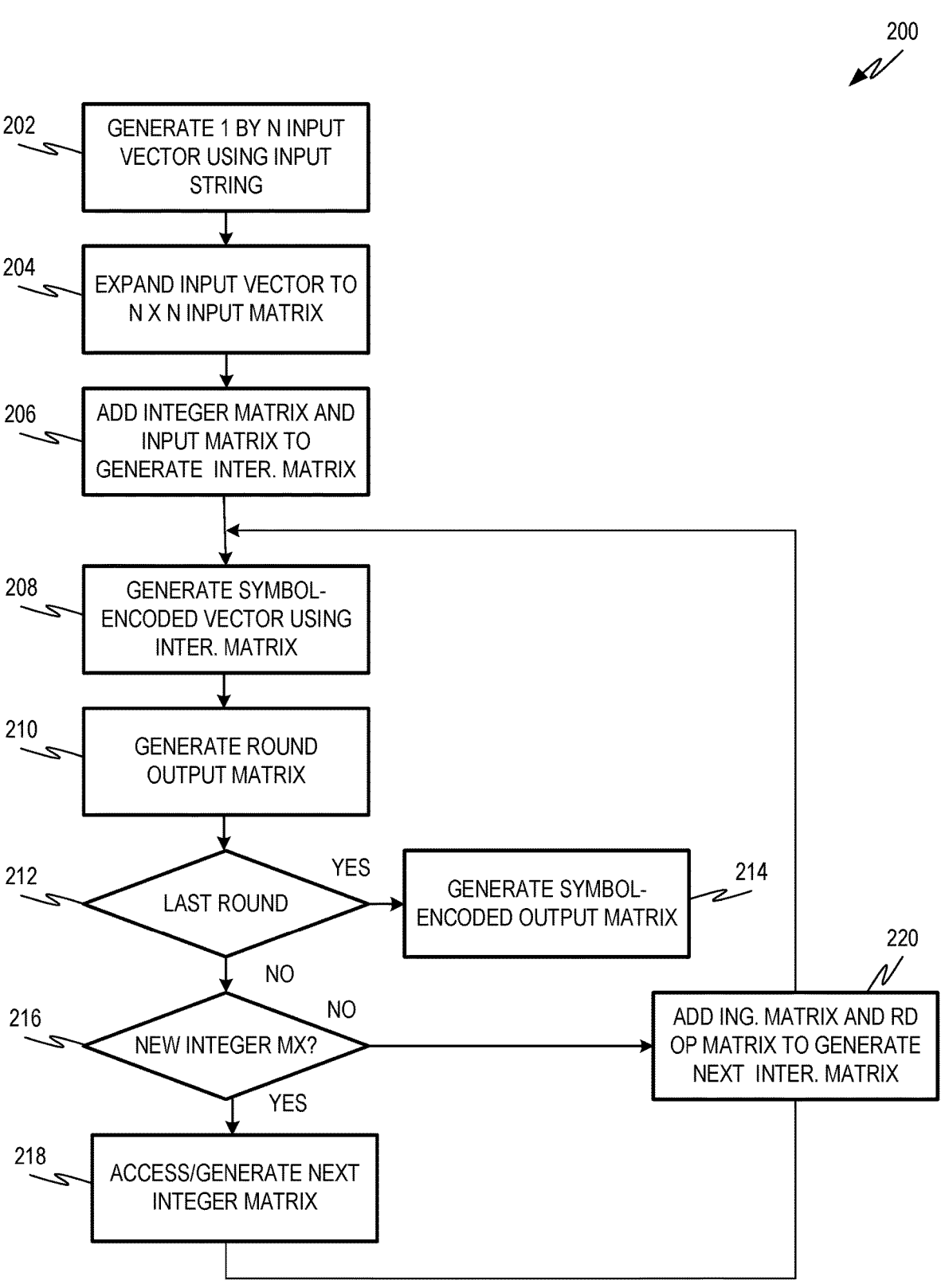
FIG. 2 is a flowchart showing one example of a process flow that may be performed by the hashing engine of FIG. 1 to generate the hash from an input string and one or more integer sequences.

FIG. 2 is a flowchart showing one example of a process flow 200 that may be performed by the hashing engine 104 to generate the hash 106 from an input string 110 and one or more integer sequences 108. At operation 202, the hashing engine 104 may generate a 1 by N input vector from the input string 110. N may be a constant integer selected as a parameter of the hashing engine 104. N may have a value equal to any suitable integer such as, for example, 4, 8, 64, 128, and/or the like. The input string 110 may be fit to the 1 by N input vector by wrapping the input string to an X by N matrix and then summing the columns of the X by N matrix, as described herein, for example, with respect to FIG. 3.

At operation 204, the hashing engine 104 may expand the 1 by N input vector to an N by N input matrix. In some examples, the expansion may be performed by writing the input vector and circularly shifted versions of the input vector to the rows of the input matrix. Examples for generating the input matrix are described herein, for example, with respect to FIG. 4.

At operation 206, the hashing engine 104 may add the input matrix and an integer matrix to generate an intermediate matrix. The integer matrix may be an N by N matrix generated from one or more of the integer sequences 108. Accordingly, the intermediate matrix may also be an N by N matrix.

In some examples, the integer matrix is generated from a sequence of N integers. Any sequence of N integers may be used. In some examples, the sequence of N integers may be taken from a publicly available source such as, for example, The Online Encyclopedia of Integer Sequences®. Examples of integer sequences that may be used include a sequence of perfect numbers, a sequence of superperfect numbers, a sequence from a number of trees with n unlabeled nodes, a sequence of pseudo-perfect numbers, and/or the like. The sequence of N integers may be taken from any portion of a publicly available source of integer sequences and/or from any other source. To generate the integer matrix, in some examples, the sequence of integers may be arranged as an integer vector and multiplied with a transpose of the integer vector, resulting in the N by N sequence matrix.

In some examples, the integer matrix is pre-generated before execution of the hashing engine 104 to generate the hash 106. Accordingly, during execution of the hashing engine 104 to generate the hash 106, the hashing engine 104 may access one or more pre-generated integer matrices. In other examples, the integer matrix may be generated during execution of the hashing engine 104 to generate the hash 106. For example, the hashing engine 104 may be arranged to access one or more integer sequences 108 and convert the one or more integer sequences to the N by N integer matrix during execution to generate the hash 106.

At operation 208, the hashing engine 104 may utilize the intermediate matrix to generate a symbol-encoded vector. The symbol-encoded vector may be a 1 by N vector that is symbol-encoded such that values in the vector correspond to symbols from a symbol encoding, such as ASCII or the like. Examples describing how a symbol-encoded vector may be generated from an intermediate matrix are described herein, for example, with respect to FIG. 5.

At operation 210, the hashing engine 104 may generate a round output matrix using the symbol-encoded vector and the intermediate matrix. Various examples for generating the round output matrix are described herein, for example, with respect to FIG. 6. At operation 212, the hashing engine 104 may determine whether a current round of the hashing is the last round to be executed. For example, the hashing described by the process flow 200 may be executed in any suitable number of rounds. If the current round is not the last round, then the hashing engine 104 may, at operation 216, determine if the next round is to use the same integer matrix as the current round. If the next round is to use a new or different integer matrix, then the hashing engine 104 may access and/or generate a next integer matrix at operation 218. The next integer matrix may be accessed and or generated, for example, as described herein. In some examples, different rounds of the process flow 200 may utilize integer matrices derived from the same integer sequence or different integer sequences. After generating and/or accessing a next integer matrix or after determining that the same integer matrix is to be used for the next round, the hashing engine 104 may, at operation 220, add the current integer matrix and the round output matrix to generate a next intermediate matrix. The hashing engine 104 may then return to operation 208 to execute a next round. If a new integer matrix is accessed and or generated at operation 218, then the integer matrix used at operation 220 may be the new integer matrix. If the next round is to use the same integer matrix as the previous round, then the integer matrix used at operation 220 may be the previous integer matrix.

If, at operation 212, the hashing engine 104 determines that the current round is the final or last round, then the hashing engine 104 may generate a symbol-encoded output matrix from the current round output matrix at operation 214. For example, the hashing engine 104 may map values from the current round output to a symbol encoding range. The symbol-encoded output matrix generated at operation 214, in some examples, is returned as the hash 106. Also, in some examples, the hash 106 is generated from the symbol-encoded output matrix, for example, by expressing the values from the symbol encoded output matrix sequentially.

The symbol encoding range may be a range of values corresponding to all or part of a symbol encoding, such as ASCII. In some examples, mapping a value to a symbol encoding range may comprise applying a modulo function to the value. The modulo function used may depend on the desired encoding range. For example, ASCII may include values from 0 to 127, with each value corresponding to one of 128 characters. A value may be mapped to a symbol encoding range corresponding to all of ASCII by applying a modulo 128 to the value. Consider another example in which the symbol encoding range is a subset of the full ASCII encoding range. For example, ASCII values 48 through 90 may correspond to Arabic numerals 0 through 9, capital letters A through Z, and punctuation marks ":", ";", "<", "=", ">", "?", and "@". Mapping values to a symbol encoding range corresponding to 48 through 90 of ASCII may include applying a modulo 42 function and then adding an offset of 48, resulting in an offset symbol-encoded value.

Figure 3:
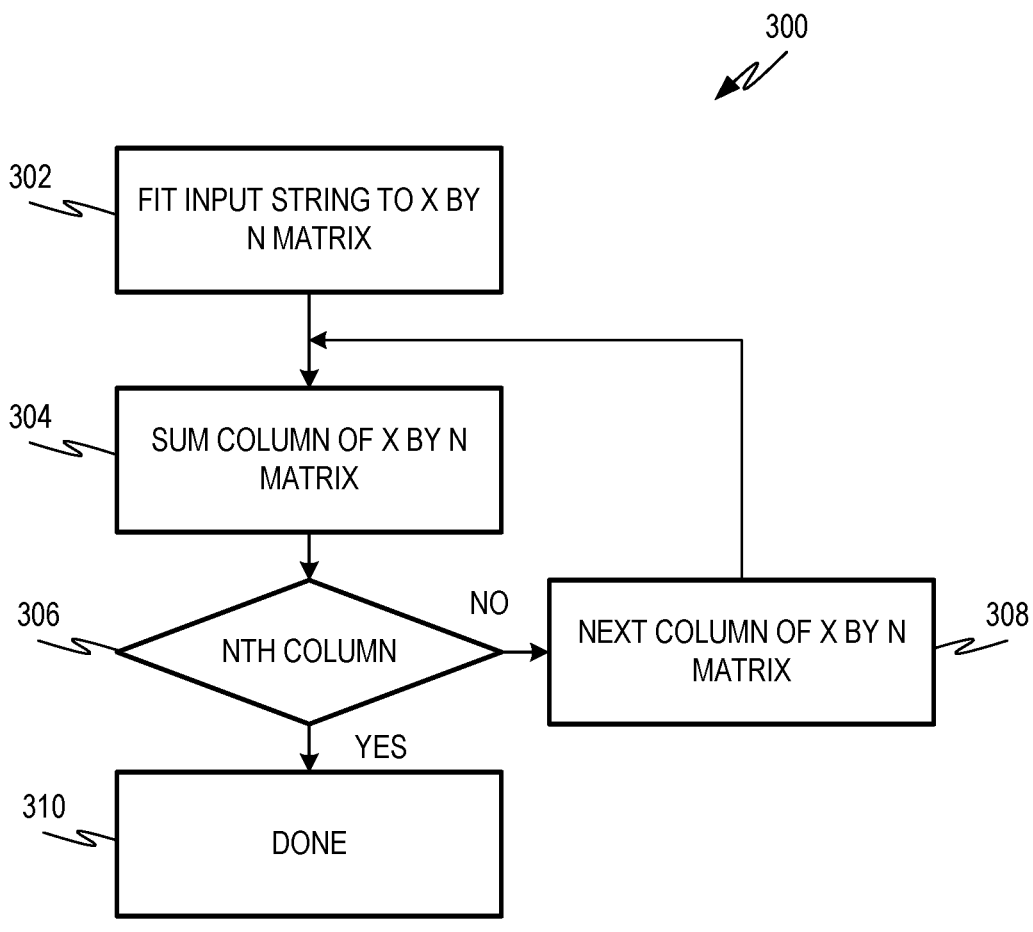
FIG. 3 is a flowchart showing one example of a process flow that may be executed by the hashing engine of FIG. 1 to generate an input vector from an arbitrarily-sized input string.

FIG. 3 is a flowchart showing one example of a process flow 300 that may be executed by the hashing engine 104 of FIG. 1 to generate an input vector from an arbitrarily-sized input string 110. For example, the process flow 300 shows one example way that the hashing engine may execute the operation 202 of the process flow 200.

At operation 302, the hashing engine 104 may fit the input string 110 to an X by N matrix. For example, the hashing engine 104 may fit the first N values from the input string to a first row of the X by N matrix. The next N values from the input string are fit to a second row of the X by N matrix and so on until all of the values of the input string 110 are included in the X by N matrix. If the input string includes a number of values that are not divisible by N, then the Xth row of the X by N matrix may not be filled. In some examples, any positions in the X by N matrix that are not filled may be populated with zeros. The number of rows, X, in the X by N matrix may be based on the number of values in the input string 110.

At operation 304, the hashing engine 104 may generate a sum of a first column of the X by N matrix. The sum of the first column of the X by a matrix may be a first value of the 1 by N input vector. At operation 306, the hashing engine 104 may determine if the currently considered column of the X by N matrix is the Nth column. If the currently considered column of the X by N matrix is not the Nth column, then the hashing engine 104 may, at operation 308, increment to a next column of the X by N matrix. If the currently considered column of the X by N matrix is the Nth column, then the process flow may complete at operation 310. The result may be the 1×N input vector.

Figure 4:
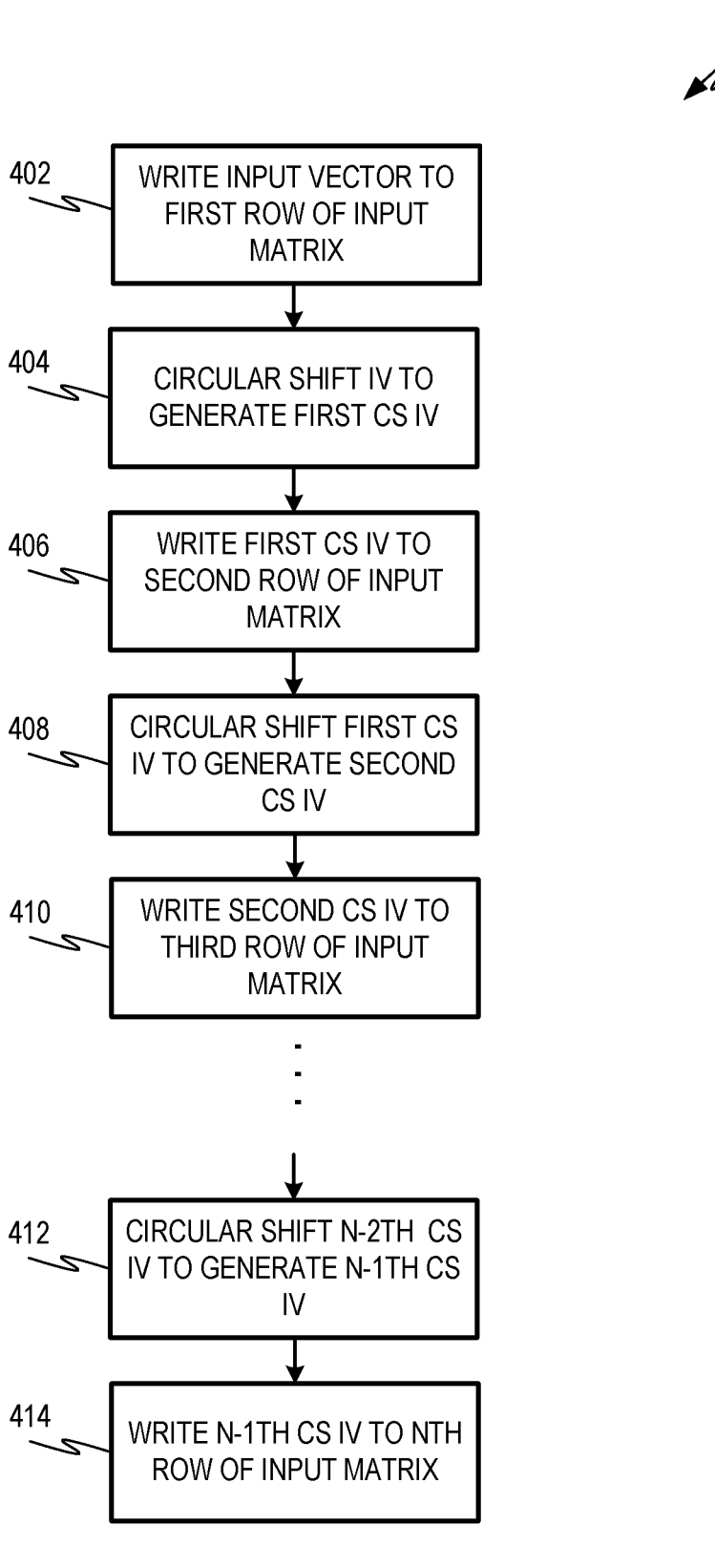
FIG. 4 is a flowchart showing one example of a process flow that may be executed by the hashing engine of FIG. 1 to expand the input vector to generate the input matrix.

FIG. 4 is a flowchart showing one example of a process flow 400 that may be executed by the hashing engine 104 to expand the input vector to generate the input matrix. For example, the process flow 400 shows one example way that the hashing engine 104 can execute the operation 204 of the process flow 200.

At operation 402, the hashing engine 104 may write the 1 by N input vector to a first row of the input matrix. At operation 404, the hashing engine 104 may circular shift the input vector to generate a first circularshifted input vector. Circular shifting the input vector may comprise shifting a position of each value of the input vector by one and moving the leftover value to the opposite side of the vector. For example, if the input vector is circularly shifted from left to right, the first value may be moved to the second position, the second value may be moved to the third position, the fourth value may be moved to the fifth position, and so on until the (N−1)th value is moved to the Nth position. In this example, the leftover value is the Nth value, which is moved to the first position. In another example, if the input vector is circularly shifted from right to left, the Nth value may be moved to the (N−1) position, the (N−1)th value may be moved to the (N−2)th position, and so on. In this example, the leftover value is the first value, which is moved to the Nth position.

At operation 406, the hashing engine 104 may write the first circularly shifted input vector to the second row of the input matrix. At operation 408, the hashing engine 104 may circularly shift the first circularly shifted input vector to generate a second circularly shifted input vector. The second circularly shifted input vector may be written to the third row of the input matrix at operation 410. The process may continue until, at operation 412, the hashing engine 104 circularly shifts the (N−2)th circularly shifted input vector to generate an (N−1)th circularly shifted input vector. At operation 414, the (N−1)th circularly shifted input vector is written to the Nth row of the input matrix. The result may be the N by N input matrix.

Figure 5:
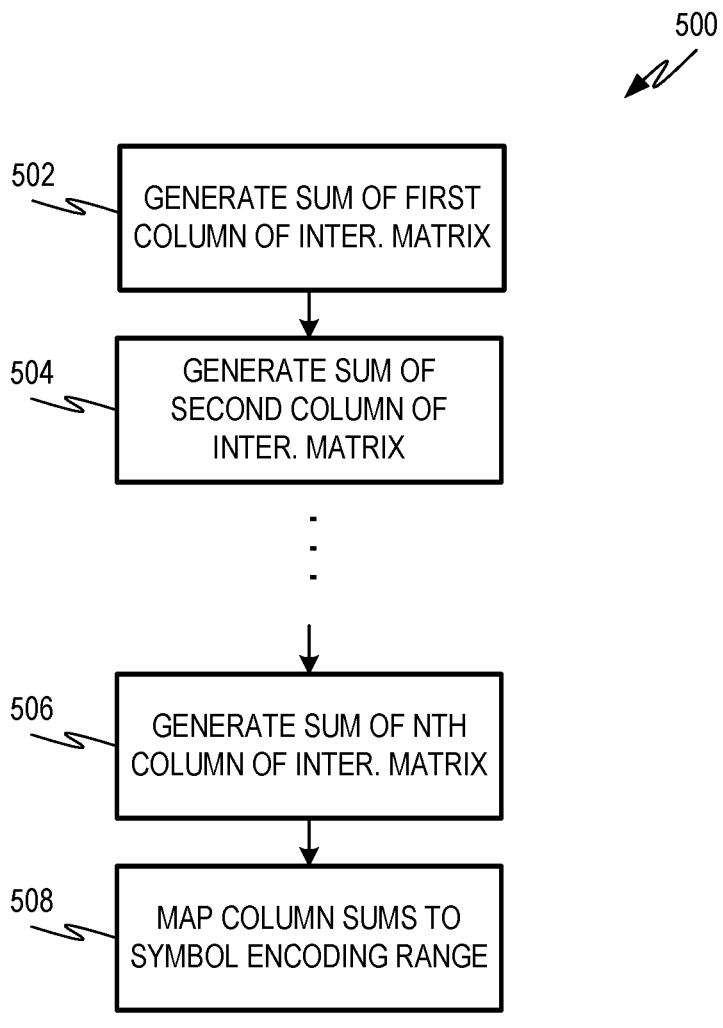
FIG. 5 is a flowchart showing one example of a process flow that may be executed by the hashing engine of FIG. 1 to generate a symbol-encoded vector.

FIG. 5 is a flowchart showing one example of a process flow 500 that may be executed by the hashing engine 104 of FIG. 1 for generating a symbol-encoded vector. For example, the process flow 500 shows one example way that the hashing engine 104 can perform the operation 208 of the process flow 200. The process flow 500 begins with an intermediate matrix, which is an N by N matrix. At operation 502, the hashing engine 104 generates a sum of a first column of the intermediate matrix. This may include summing all of the values in the first column of the intermediate matrix. At operation 504, the hashing engine 104 generates a sum of the second column of the intermediate matrix. This may continue until, at operation 506, the hashing engine generates a sum of the Nth column of the intermediate matrix. The result may be a 1×N column sum vector comprising N values. At operation 508, the hashing engine maps the values of the column sum vector to a symbol encoding range, for example, as described herein. This may include, for example, applying a modulo function to each of the values of the column sum vector and, optionally, applying an offset to each of the values of the column sum vector to generate offset symbol-encoded values. The result may be the symbol-encoded vector.

Figure 6:
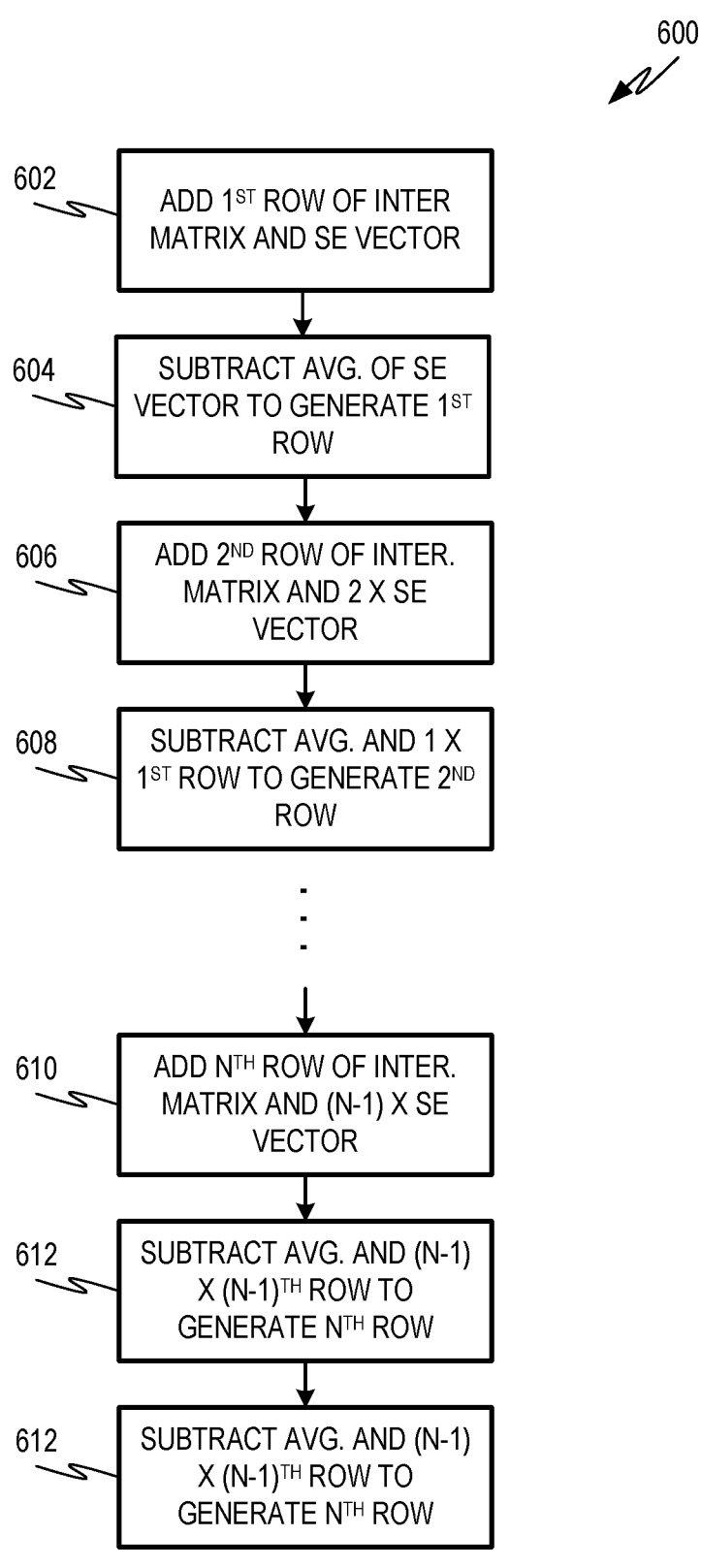
FIG. 6 is a flowchart showing one example of a process flow that may be executed by the hashing engine of FIG. 1 for generating a round output matrix using an intermediate matrix and a symbol-encoded vector.

FIG. 6 is a flowchart showing one example of a process flow 600 that may be executed by the hashing engine 104 of FIG. 1 for generating a round output matrix using an intermediate matrix and a symbol-encoded vector. For example, the process flow 600 shows one example way that the hashing engine 104 may perform the operation 210 of the process flow 200.

At operation 602, the hashing engine 104 may add the symbol encoded vector to the first row of the intermediate matrix. From the sum, the hashing engine may subtract an average value of the symbol encoded vector at operation 604. This may yield a first row of the round output matrix. At operation 606, the hashing engine may add a second row of the intermediate matrix to the symbol encoded vector multiplied by two. From the result of operation 606, the hashing engine 104 may, at operation 608, subtract the average of the symbol encoded vector and the first row of the round output matrix. The result may be a second row of the round output matrix.

This process may continue through the rows until, at operation 610, the hashing engine 104 adds the Nth row of the intermediate matrix to the symbol-encoded matrix multiplied by (N−1). From this result, the hashing engine 104, at operation 612, subtracts the average of the symbol encoded matrix and the (N−1)th row of the round output matrix multiplied by (N−1). The result may be the Nth row of the round output matrix. In some examples, the absolute values may be entered into the round output matrix.

Consider an example in which N is equal to 8 and the hashing engine 104 receives the input string 110 given by Input String [1] below:

VerySecretPassword123                                        [1]

In this example, the hashing engine 104 also receives an integer sequence given by SEQUENCE 1 below.

| SEQUENCE 1: | | | | | | | |
|---|---|---|---|---|---|---|---|
| 1 | 2 | 3 | 6 | 11 | 23 | 47 | 106 |

The integer sequence may be expanded to an 8 by 8 integer matrix by adding the integer sequence shown by SEQUENCE 1 to its transpose, yielding the integer matrix given by INTEGER MATRIX 1.

| INTEGER MATRIX 1: | | | | | | | |
|---|---|---|---|---|---|---|---|
| 2 | 3 | 4 | 7 | 12 | 24 | 48 | 107 |
| 3 | 4 | 5 | 8 | 13 | 25 | 49 | 108 |
| 4 | 5 | 6 | 9 | 14 | 26 | 50 | 109 |
| 7 | 8 | 9 | 12 | 17 | 29 | 53 | 112 |
| 12 | 13 | 14 | 17 | 22 | 34 | 58 | 117 |
| 24 | 25 | 26 | 29 | 34 | 46 | 70 | 129 |
| 48 | 49 | 50 | 53 | 58 | 70 | 94 | 153 |
| 107 | 108 | 109 | 112 | 117 | 129 | 153 | 212 |

Input String [1] comprises 21 characters. Input String [1] may be converted to a 1 by 8 input vector, for example, as described herein with respect to FIGS. 2 and 3. For example, fitting the String [1] to an X by 8 matrix may result in MATRIX 1 below.

| MATRIX 1 | | | | | | | |
|---|---|---|---|---|---|---|---|
| V | e | R | y | S | e | c | r |
| e | t | P | a | s | s | w | o |
| r | d | 1 | 2 | 3 | 0 | 0 | 0 |

In this example, three rows are used to fit all of the values of the Input String [1], so MATRIX 1 is a 3 by 8 matrix and X is equal to 8. Also, as shown by MATRIX 1, column values in the third row that are not populated with values from the Input String [1] are set to zero.

A representation of MATRIX 1 showing corresponding ASCII values is given by MATRIX 2 below.

| MATRIX 2: | | | | | | | |
|---|---|---|---|---|---|---|---|
| 86 | 101 | 114 | 121 | 83 | 101 | 99 | 114 |
| 101 | 116 | 80 | 97 | 115 | 115 | 119 | 111 |
| 114 | 100 | 49 | 50 | 51 | | | |

As described herein with respect to FIG. 2 and FIG. 3, the columns of the 3 by 8 matrix MATRIX 2 are summed to generate the 1 by 8 input vector given by INPUT VECTOR 3 below.

| INPUT VECTOR 3: | | | | | | | |
|---|---|---|---|---|---|---|---|
| 301 | 317 | 243 | 268 | 249 | 216 | 218 | 225 |

INPUT VECTOR 3 may be expanded to an 8 by 8 input matrix, for example as described herein with respect to FIGS. 2 and 4. An example 8 by 8 input matrix generated from the INPUT VECTOR 3 is given by MATRIX 4 below.

| INPUT MATRIX 4: | | | | | | | |
|---|---|---|---|---|---|---|---|
| 301 | 317 | 243 | 268 | 249 | 216 | 218 | 225 |
| 225 | 301 | 317 | 243 | 268 | 249 | 216 | 218 |
| 218 | 225 | 301 | 317 | 243 | 268 | 249 | 216 |
| 216 | 218 | 225 | 301 | 317 | 243 | 268 | 249 |
| 249 | 216 | 218 | 225 | 301 | 317 | 243 | 268 |
| 268 | 249 | 216 | 218 | 225 | 301 | 317 | 243 |
| 243 | 268 | 249 | 216 | 218 | 225 | 301 | 317 |
| 317 | 243 | 268 | 249 | 216 | 218 | 225 | 301 |

The input matrix INPUT MATRIX 4 and integer matrix INTEGER MATRIX 1 may be added to generate an intermediate matrix, for example, as described herein with respect to FIG. 2. An example sum of the INPUT MATRIX 4 and the INTEGER MATRIX 1 is given by INTERMEDIATE MATRIX 5 below.

| INTERMEDIATE MATRIX 5: | | | | | | | |
|---|---|---|---|---|---|---|---|
| 303 | 320 | 247 | 275 | 261 | 240 | 266 | 332 |
| 228 | 305 | 322 | 251 | 281 | 274 | 265 | 326 |
| 222 | 230 | 307 | 326 | 257 | 294 | 299 | 325 |
| 223 | 226 | 234 | 313 | 334 | 272 | 321 | 361 |
| 261 | 229 | 232 | 242 | 323 | 351 | 301 | 385 |
| 292 | 274 | 242 | 247 | 259 | 347 | 387 | 372 |
| 291 | 317 | 299 | 269 | 276 | 295 | 395 | 470 |
| 242 | 351 | 377 | 361 | 333 | 347 | 378 | 513 |

The hashing engine 104 may generate a symbol encoded vector from the INTERMEDIATE MATRIX 5, for example as described herein with respect to FIGS. 2 and 5. An example sum of the columns of the intermediate matrix is given by VECTOR 6 below.

| VECTOR 6: | | | | | | | |
|---|---|---|---|---|---|---|---|
| 2244 | 2252 | 2260 | 2284 | 2324 | 2420 | 2612 | 3084 |

The 1 by 8 VECTOR 6 may be mapped to an example symbol encoding rage that includes ASCII values 48-90 by applying a modulo 42 function, indicated by VECTOR 7 below, and then adding an offset of 48, yielding the SYMBOL ENCODED VECTOR 8 below.

| VECTOR 7: | | | | | | | |
|---|---|---|---|---|---|---|---|
| 18 | 26 | 34 | 16 | 14 | 26 | 8 | 18 |

| SYMBOL-ENCODED VECTOR 8: | | | | | | | |
|---|---|---|---|---|---|---|---|
| 66 | 74 | 82 | 64 | 62 | 74 | 56 | 66 |

In this example, the average of the SYMBOL ENCODED VECTOR 8 is 68.

The SYMBOL ENCODED VECTOR 8 and INTERMEDIATE MATRIX 5 may be combined, for example, as described with respect to FIGS. 2 and 6, to generate a round output matrix given by ROUND OUTPUT MATRIX 9 below.

| ROUND OUTPUT MATRIX 9: | | | | | | | |
|---|---|---|---|---|---|---|---|
| 301 | 326 | 261 | 271 | 255 | 246 | 254 | 330 |
| 9 | 59 | 157 | 40 | 82 | 108 | 55 | 60 |
| 334 | 266 | 171 | 370 | 211 | 232 | 289 | 335 |
| 583 | 344 | 19 | 609 | 119 | 196 | 390 | 448 |
| 1809 | 845 | 498 | 1942 | 89 | 131 | 1047 | 1145 |
| 8425 | 3575 | 1824 | 9147 | 118 | 68 | 4580 | 5025 |
| 49865 | 20683 | 10139 | 54233 | 66 | 337 | 26761 | 29286 |
| 348353 | 143906 | 70008 | 378826 | 299 | 1488 | 186569 | 204029 |

In examples in which the described hashing technique is conducted in multiple rounds, the ROUND OUTPUT MATRIX 9 may be provided as input to the next round, for example, as described by FIG. 2. In some examples, a single round may be performed.

In examples in which a single round is performed, the ROUND OUTPUT MATRIX 9 may be converted to a symbol encoded matrix, for example, as described by FIG. 2. In examples in which the ROUND OUTPUT MATRIX 9 is mapped to an example symbol encoding rage that includes ASCII values 48-90, the mapping may include applying a modulo 42 function to each value and then adding an offset of 48. An example SYMBOL-ENCODED MATRIX 10 generated in this manner from the ROUND OUTPUT MATRIX 9 is shown below.

| SYMBOL-ENCODED MATRIX 10: | | | | | | | |
|---|---|---|---|---|---|---|---|
| 55 | 80 | 57 | 67 | 51 | 84 | 50 | 84 |
| 57 | 65 | 79 | 88 | 88 | 72 | 61 | 66 |
| 88 | 62 | 51 | 82 | 49 | 70 | 85 | 89 |
| 85 | 56 | 67 | 69 | 83 | 76 | 60 | 76 |
| 51 | 53 | 84 | 58 | 53 | 53 | 87 | 59 |
| 73 | 53 | 66 | 81 | 82 | 74 | 50 | 75 |
| 59 | 67 | 65 | 59 | 72 | 49 | 55 | 60 |
| 53 | 62 | 84 | 76 | 53 | 66 | 53 | 83 |

The SYMBOL-ENCODED MATRIX 10 populated with corresponding ASCII symbols is given by SYMBOL-ENCODED MATRIX 11 below.

| SYMBOL-ENCODED MATRIX 11: | | | | | | | |
| --- | --- | --- | --- | --- | --- | --- | --- |
| 7 | P | 9 | C | 3 | T | 2 | T |
| 9 | A | O | X | X | H | = | B |
| X | > | 3 | R | 1 | F | U | Y |
| U | 8 | C | E | S | L | < | L |
| 3 | 5 | T | : | 5 | 5 | W | ; |
| I | 5 | B | Q | R | J | 2 | K |
| ; | C | A | ; | H | 1 | 7 | < |
| 5 | > | T | L | 5 | B | 5 | S |

EXAMPLES

Example 1 is a system for hashing an input string, the system comprising: at least one processor programmed to perform operations comprising: accessing the input string; generating a 1 by N input vector using the input string, N being a constant number; expanding the input vector to an input matrix, the input matrix having a size of N by N; accessing a first integer matrix, the first integer matrix having a size of N by N; adding the first integer matrix and the input matrix to generate an intermediate matrix; generating a symbol-encoded vector using the intermediate matrix; generating a first round output matrix using the symbol-encoded vector and the intermediate matrix; and generating a hash for the input string based at least in part on the first round output matrix.

In Example 2, the subject matter of Example 1 optionally includes the hash comprising a symbol-encoded N×N matrix.

In Example 3, the subject matter of any one or more of Examples 1-2 optionally includes by N input vector comprising determining a sum of a first column of an X by N matrix, X being a number, the X by N matrix comprising a first row comprising a first N characters of the input string and a second row comprising at least one character of the input string positioned after the first N characters of the input string.

In Example 4, the subject matter of any one or more of Examples 1-3 optionally includes the expanding of the input vector to the input matrix comprising: writing the input vector to a first row of the input matrix; circular shifting the input vector to generate a first circular shifted input vector; and writing the first circular shifted input vector to a second row of the input matrix.

In Example 5, the subject matter of Example 4 optionally includes the expanding of the input vector to the input matrix further comprising: circular shifting the first circular shifted input vector to generate a second circular shifted input vector; and writing the second circular shifted input vector to a third row of the input matrix.

In Example 6, the subject matter of any one or more of Examples 1-5 optionally includes the operations further comprising generating the first integer matrix, the generating of the first integer matrix comprising: accessing a sequence of N integers; and multiplying an integer vector comprising the sequence of N integers by a transpose of the integer vector.

In Example 7, the subject matter of any one or more of Examples 1-6 optionally includes the generating of the symbol-encoded vector using the intermediate matrix comprising: for a first column of the intermediate matrix, generating a first column sum; and mapping the first column sum to a symbol encoding range to generate a first symbol-encoded value.

In Example 8, the subject matter of Example 7 optionally includes the generating of the symbol-encoded vector further comprising adding an offset to the first symbol-encoded value to generate an offset symbol-encoded value.

In Example 9, the subject matter of any one or more of Examples 1-8 optionally includes the generating of the first round output matrix comprising: generating a first row of the first round output matrix using the symbol-encoded vector, a first row of the intermediate matrix, and an average of the symbol-encoded vector; and generating a second row of the first round output matrix using the symbol-encoded vector, a second row of the intermediate matrix, the average of the symbol-encoded vector, and the first row of the first round output matrix.

In Example 10, the subject matter of any one or more of Examples 1-9 optionally includes the generating of the hash for the input string comprising mapping the first round output matrix to a symbol encoding range.

In Example 11, the subject matter of any one or more of Examples 1-10 optionally includes the operations further comprising generating a second round output matrix using the first round output matrix and the first integer matrix, the generating of the hash for the input string also being based at least in part on the second round output matrix.

In Example 12, the subject matter of Example 11 optionally includes the generating of the hash for the input string comprising mapping the second round output matrix to a symbol encoding range.

Example 13 is a method for hashing an input string, the method comprising: accessing, by at least one processor, the input string; generating, by the at least one processor, a 1 by N input vector using the input string, N being a constant number; expanding the input vector to an input matrix, by the at least one processor, the input matrix having a size of N by N; accessing, by the at least one processor, a first integer matrix, the first integer matrix having a size of N by N; adding the first integer matrix and the input matrix, by the at least one processor, to generate an intermediate matrix; generating a symbol-encoded vector, by the at least one processor, using the intermediate matrix; generating a first round output matrix, by the at least one processor, the generating using the symbol-encoded vector and the intermediate matrix; and generating a hash for the input string based at least in part on the first round output matrix.

In Example 14, the subject matter of Example 13 optionally includes the hash comprising a symbol-encoded N×N matrix.

In Example 15, the subject matter of any one or more of Examples 13-14 optionally includes by N input vector comprising determining a sum of a first column of an X by N matrix, X being a number, the X by N matrix comprising a first row comprising a first N characters of the input string and a second row comprising at least one character of the input string positioned after the first N characters of the input string.

In Example 16, the subject matter of any one or more of Examples 13-15 optionally includes the expanding of the input vector to the input matrix comprising: writing the input vector to a first row of the input matrix; circular shifting the input vector to generate a first circular shifted input vector; and writing the first circular shifted input vector to a second row of the input matrix.

In Example 17, the subject matter of Example 16 optionally includes the expanding of the input vector to the input matrix further comprising: circular shifting the first circular shifted input vector to generate a second circular shifted input vector; and writing the second circular shifted input vector to a third row of the input matrix.

In Example 18, the subject matter of any one or more of Examples 13-17 optionally includes generating the first integer matrix, the generating of the first integer matrix comprising: accessing a sequence of N integers; and multiplying an integer vector comprising the sequence of N integers by a transpose of the integer vector.

In Example 19, the subject matter of any one or more of Examples 13-18 optionally includes the generating of the symbol-encoded vector using the intermediate matrix comprising: for a first column of the intermediate matrix, generating a first column sum; and mapping the first column sum to a symbol encoding range to generate a first symbol-encoded value.

Example 20 is a non-transitory machine-readable medium comprising instructions thereon that, when executed by at least one processor, cause the at least one processor to perform operations comprising: accessing an input string; generating a 1 by N input vector using the input string, N being a constant number; expanding the input vector to an input matrix, the input matrix having a size of N by N; accessing a first integer matrix, the first integer matrix having a size of N by N; adding the first integer matrix and the input matrix to generate an intermediate matrix; generating a symbol-encoded vector using the intermediate matrix; generating a first round output matrix using the symbol-encoded vector and the intermediate matrix; and generating a hash for the input string based at least in part on the first round output matrix.

Figure 7:
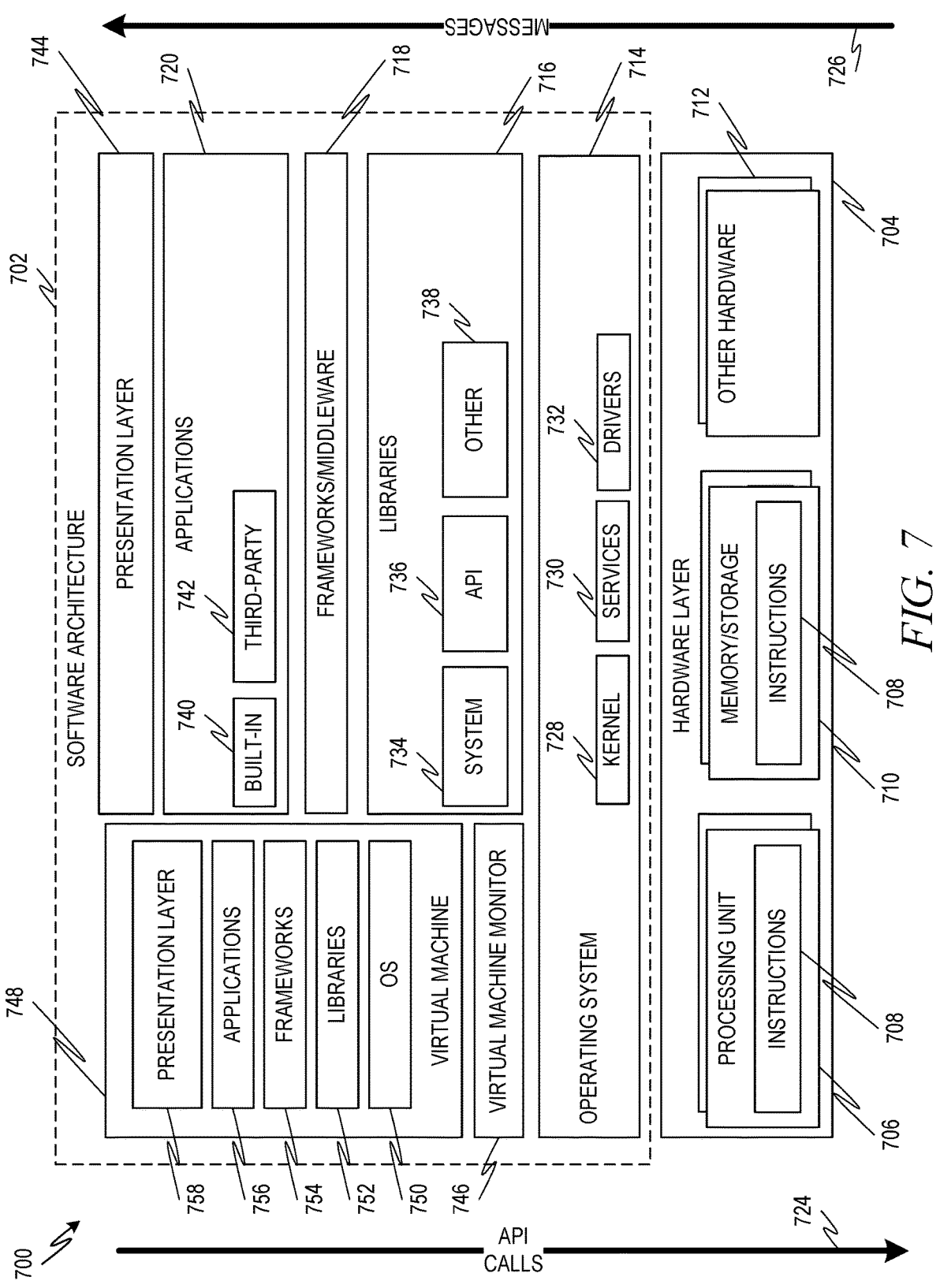
FIG. 7 is a block diagram showing one example of an architecture for a computing device.

FIG. 7 is a block diagram 700 showing one example of a software architecture 702 for a computing device. The architecture 702 may be used in conjunction with various hardware architectures, for example, as described herein. FIG. 7 is merely a non-limiting example of a software architecture and many other architectures may be implemented to facilitate the functionality described herein. A representative hardware layer 704 is illustrated and can represent, for example, any of the above referenced computing devices. In some examples, the hardware layer 704 may be implemented according to the architecture of the computer system of FIG. 8.

The representative hardware layer 704 comprises one or more processing units 706 having associated executable instructions 708. Executable instructions 708 represent the executable instructions of the software architecture 702, including implementation of the methods, modules, subsystems, and components, and so forth described herein and may also include memory and/or storage modules 710, which also have executable instructions 708. Hardware layer 704 may also comprise other hardware as indicated by other hardware 712 which represents any other hardware of the hardware layer 704, such as the other hardware illustrated as part of the architecture 702.

In the example architecture of FIG. 7, the software architecture 702 may be conceptualized as a stack of layers where each layer provides particular functionality. For example, the software architecture 702 may include layers such as an operating system 714, libraries 716, middleware layer 718, applications 720, and presentation layer 744. Operationally, the applications 720 and/or other components within the layers may invoke Application Programming Interface (API) calls 724 through the software stack and access a response, returned values, and so forth illustrated as messages 726 in response to the API calls 724. The layers illustrated are representative in nature and not all software architectures have all layers. For example, some mobile or special purpose operating systems may not provide a middleware layer 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. In some examples, the services 730 include an interrupt service. The interrupt service may detect the receipt of an interrupt and, in response, cause the architecture 702 to pause its current processing and execute an interrupt service routine (ISR) when an interrupt is accessed.

The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 716 may provide a common infrastructure that may be utilized by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 716 may include system 734 libraries (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The middleware layer 718 (also sometimes referred to as frameworks) may provide a higher-level common infrastructure that may be utilized by the applications 720 and/or other software components/modules. For example, the middleware layer 718 may provide various graphical user interface (GUI) functions, high-level resource management, high-level location services, and so forth. The middleware layer 718 may provide a broad spectrum of other APIs that may be utilized by the applications 720 and/or other software components/modules, some of which may be specific to a particular operating system or platform.

The applications 720 includes built-in applications 740 and/or third-party applications 742. Examples of representative built-in applications 740 may include, but are not limited to, a contacts application, a browser application, a book reader application, a location application, a media application, a messaging application, and/or a game application. Third-party applications 742 may include any of the built-in applications 740 as well as a broad assortment of other applications. In a specific example, the third-party application 742 (e.g., an application developed using the Android™ or iOS™ software development kit (SDK) by an entity other than the vendor of the particular platform) may be mobile software running on a mobile operating system such as iOS™ Android™, Windows® Phone, or other mobile computing device operating systems. In this example, the third-party application 742 may invoke the API calls 724 provided by the mobile operating system such as operating system 714 to facilitate functionality described herein.

The applications 720 may utilize built-in operating system functions (e.g., kernel 728, services 730 and/or drivers 732), libraries (e.g., system 734, API libraries 736, and other libraries 738), and middleware layer 718 to create user interfaces (UIs) to interact with users of the system. Alternatively, or additionally, in some systems, interactions with a user may occur through a presentation layer, such as presentation layer 744. In these systems, the application/module "logic" can be separated from the aspects of the application/module that interact with a user.

Some software architectures utilize virtual machines. In the example of FIG. 7, this is illustrated by virtual machine 748. A virtual machine creates a software environment where applications/modules can execute as if they were executing on a hardware computing device. A virtual machine is hosted by a host operating system (operating system 714) and typically, although not always, has a virtual machine monitor 746, which manages the operation of the virtual machine as well as the interface with the host operating system (i.e., operating system 714). A software architecture executes within the virtual machine such as an operating system 750, libraries 752, frameworks/middleware 754, applications 756 and/or presentation layer 758. These layers of software architecture executing within the virtual machine 748 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 8:
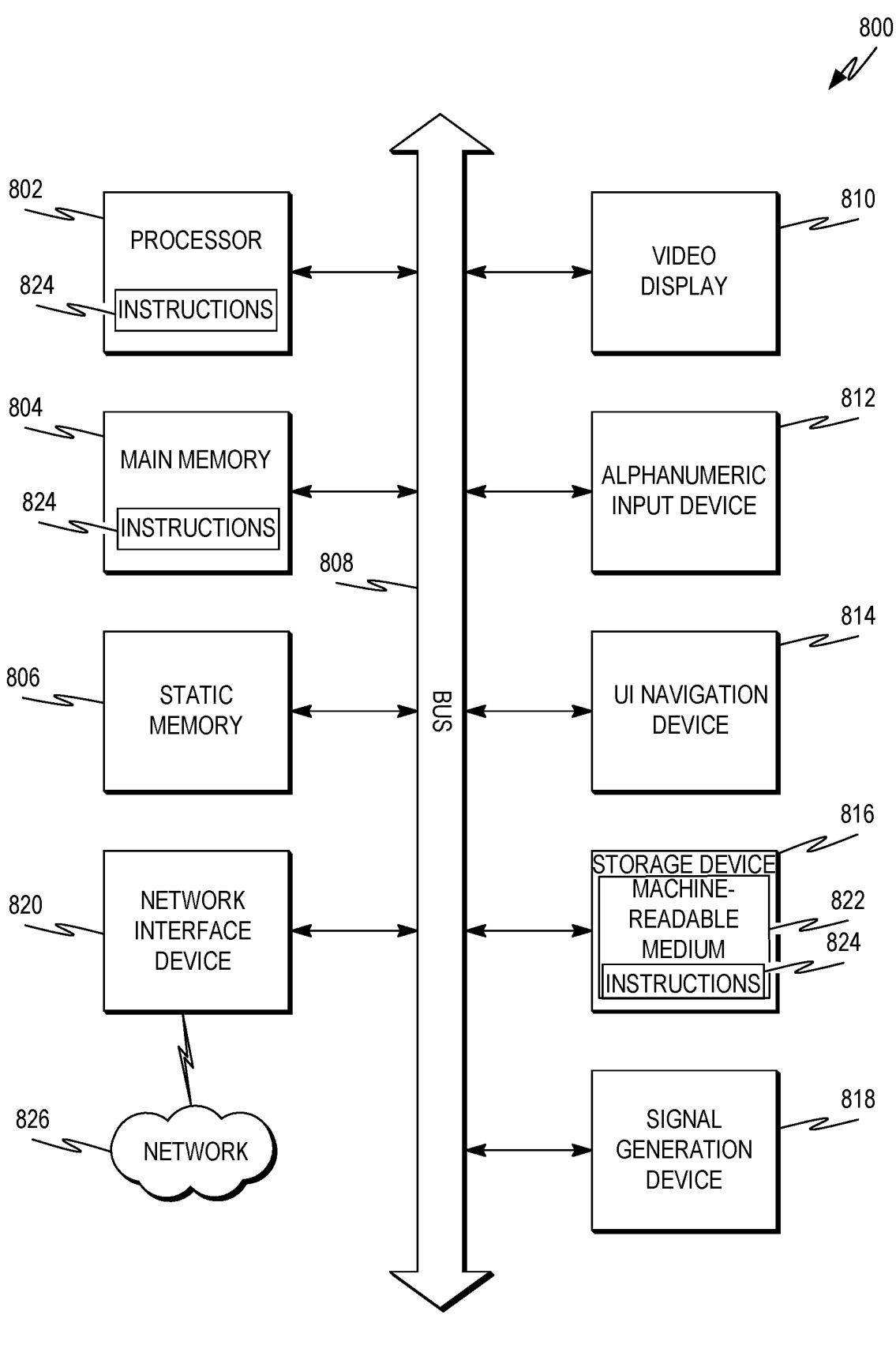
FIG. 8 is a block diagram of a machine in the example form of a computer system within which instructions may be executed for causing the machine to perform any one or more of the methodologies discussed herein.

FIG. 8 is a block diagram of a machine in the example form of a computer system 800 within which instructions 824 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804, and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard or a touch-sensitive display screen), a UI navigation (or cursor control) device 814 (e.g., a mouse), a disk drive unit 816, a signal generation device 818 (e.g., a speaker), and a network interface device 820.

Machine-Readable Medium

The disk drive unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, with the main memory 804 and the processor 802 also constituting machine-readable media 822.

While the machine-readable medium 822 is shown in an example embodiment to be a single medium, the term "machine-readable medium" may include a single medium or multiple media (e.g., a centralized or distributed database, and/or associated caches and servers) that store the one or more instructions 824 or data structures. The term "machine-readable medium" shall also be taken to include any tangible medium that is capable of storing, encoding, or carrying instructions 824 for execution by the machine and that cause the machine to perform any one or more of the methodologies of the present disclosure, or that is capable of storing, encoding, or carrying data structures utilized by or associated with such instructions 824. The term "machine-readable medium" shall accordingly be taken to include, but not be limited to, solid-state memories, and optical and magnetic media. Specific examples of machine-readable media 822 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 824 may further be transmitted or received over a communications network 826 using a transmission medium. The instructions 824 may be transmitted using the network interface device 820 and any one of a number of well-known transfer protocols (e.g., Hypertext Transfer Protocol (HTTP)). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 824 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for hashing an input string, the system comprising:

at least one processor programmed to perform operations comprising:

accessing the input string, the input string being data stored by a database management system at a database schema element, the database schema element being one of a table, a row, or a column;

generating a 1 by N input vector using the input string, N being a constant number;

expanding the input vector to an input matrix, the input matrix having a size of N by N;

accessing a first integer matrix, the first integer matrix having a size of N by N;

adding the first integer matrix and the input matrix to generate an intermediate matrix;

generating a symbol-encoded vector using the intermediate matrix;

generating a first round output matrix using the symbol-encoded vector and the intermediate matrix;

generating a hash for the input string based at least in part on the first round output matrix;

writing, by the database management system, the hash to an index location associated with the database schema element; and using the hash, by the database management system to identify the database schema element in response to a query directed to the database management system.

2. The system of claim 1, the hash comprising a symbol-encoded N×N matrix.

3. The system of claim 1, the input string comprising more than N characters, the generating of the 1 by N input vector comprising determining a sum of a first column of an X by N matrix, X being a number, the X by N matrix comprising a first row comprising a first N characters of the input string and a second row comprising at least one character of the input string positioned after the first N characters of the input string.

4. The system of claim 1, the expanding of the input vector to the input matrix comprising:

writing the input vector to a first row of the input matrix;

circular shifting the input vector to generate a first circular shifted input vector; and writing the first circular shifted input vector to a second row of the input matrix.

5. The system of claim 4, the expanding of the input vector to the input matrix further comprising:

circular shifting the first circular shifted input vector to generate a second circular shifted input vector; and writing the second circular shifted input vector to a third row of the input matrix.

6. The system of claim 1, the operations further comprising generating the first integer matrix, the generating of the first integer matrix comprising:

accessing a sequence of N integers; and multiplying an integer vector comprising the sequence of N integers by a transpose of the integer vector.

7. The system of claim 1, the generating of the symbol-encoded vector using the intermediate matrix comprising:

for a first column of the intermediate matrix, generating a first column sum; and mapping the first column sum to a symbol encoding range to generate a first symbol-encoded value.

8. The system of claim 7, the generating of the symbol-encoded vector further comprising adding an offset to the first symbol-encoded value to generate an offset symbol-encoded value.

9. The system of claim 1, the generating of the first round output matrix comprising:

generating a first row of the first round output matrix using the symbol-encoded vector, a first row of the intermediate matrix, and an average of the symbol-encoded vector; and generating a second row of the first round output matrix using the symbol-encoded vector, a second row of the intermediate matrix, the average of the symbol-encoded vector, and the first row of the first round output matrix.

10. The system of claim 1, the generating of the hash for the input string comprising mapping the first round output matrix to a symbol encoding range.

11. The system of claim 1, the operations further comprising generating a second round output matrix using the first round output matrix and the first integer matrix, the generating of the hash for the input string also being based at least in part on the second round output matrix.

12. The system of claim 11, the generating of the hash for the input string comprising mapping the second round output matrix to a symbol encoding range.

13. A method for hashing an input string, the method comprising:

accessing, by at least one processor, the input string, the input string being data stored by a database management system at a database schema element, the database schema element being one of a table, a row, or a column;

generating, by the at least one processor, a 1 by N input vector using the input string, N being a constant number;

expanding the input vector to an input matrix, by the at least one processor, the input matrix having a size of N by N;

accessing, by the at least one processor, a first integer matrix, the first integer matrix having a size of N by N;

adding the first integer matrix and the input matrix, by the at least one processor, to generate an intermediate matrix;

generating a symbol-encoded vector, by the at least one processor, using the intermediate matrix;

generating a first round output matrix, by the at least one processor, the generating using the symbol-encoded vector and the intermediate matrix;

generating a hash for the input string based at least in part on the first round output matrix;

writing, by the database management system, the hash to an index location associated with the database schema element; and using the hash, by the database management system to identify the database schema element in response to a query directed to the database management system.

14. The method of claim 13, the hash comprising a symbol-encoded N×N matrix.

15. The method of claim 13, the input string comprising more than N characters, the generating of the 1 by N input vector comprising determining a sum of a first column of an X by N matrix, X being a number, the X by N matrix comprising a first row comprising a first N characters of the input string and a second row comprising at least one character of the input string positioned after the first N characters of the input string.

16. The method of claim 13, the expanding of the input vector to the input matrix comprising:

writing the input vector to a first row of the input matrix;

circular shifting the input vector to generate a first circular shifted input vector; and writing the first circular shifted input vector to a second row of the input matrix.

17. The method of claim 16, the expanding of the input vector to the input matrix further comprising:

circular shifting the first circular shifted input vector to generate a second circular shifted input vector; and writing the second circular shifted input vector to a third row of the input matrix.

18. The method of claim 13, further comprising generating the first integer matrix, the generating of the first integer matrix comprising:

accessing a sequence of N integers; and multiplying an integer vector comprising the sequence of N integers by a transpose of the integer vector.

19. The method of claim 13, the generating of the symbol-encoded vector using the intermediate matrix comprising:

for a first column of the intermediate matrix, generating a first column sum; and mapping the first column sum to a symbol encoding range to generate a first symbol-encoded value.

20. A non-transitory machine-readable medium comprising instructions thereon that, when executed by at least one processor, cause the at least one processor to perform operations comprising:

accessing an input string, the input string being data stored by a database management system at a database schema element, the database schema element being one of a table, a row, or a column;

generating a 1 by N input vector using the input string, N being a constant number;

expanding the input vector to an input matrix, the input matrix having a size of N by N;

accessing a first integer matrix, the first integer matrix having a size of N by N;

adding the first integer matrix and the input matrix to generate an intermediate matrix;

generating a symbol-encoded vector using the intermediate matrix;

generating a first round output matrix using the symbol-encoded vector and the intermediate matrix;

generating a hash for the input string based at least in part on the first round output matrix;

writing, by the database management system, the hash to an index location associated with the database schema element; and using the hash, by the database management system to identify the database schema element in response to a query directed to the database management system.

\* \* \* \* \*